(12) United States Patent
Liu et al.

(10) Patent No.: US 12,440,532 B2
(45) Date of Patent: Oct. 14, 2025

(54) EDIBLE COMPOSITION FOR ALLEVIATING VISUAL FATIGUE

(71) Applicant: Shanghai Lytone Biochemicals, Ltd., Shanghai (CN)

(72) Inventors: Huanhuan Liu, Shanghai (CN); Yusheng Chen, Shanghai (CN); Weiting Tseng, Shanghai (CN); Weiting Chang, Shanghai (CN); William T. H. Chang, Shanghai (CN)

(73) Assignee: Shanghai Lytone Biochemicals, Ltd., Shanghai (CN)

( * ) Notice: Subject to any disclaimer, the term of this patent is extended or adjusted under 35 U.S.C. 154(b) by 431 days.

(21) Appl. No.: 17/962,753

(22) Filed: Oct. 10, 2022

(65) Prior Publication Data

US 2023/0048358 A1    Feb. 16, 2023

Related U.S. Application Data

(63) Continuation of application No. PCT/CN2021/079008, filed on Mar. 4, 2021.

(51) Int. Cl.
*A61K 36/9066* (2006.01)
*A61K 9/00* (2006.01)
*A61K 9/16* (2006.01)
*A61K 31/375* (2006.01)
*A61K 31/685* (2006.01)

(52) U.S. Cl.
CPC ........ *A61K 36/9066* (2013.01); *A61K 9/0053* (2013.01); *A61K 9/1623* (2013.01); *A61K 31/375* (2013.01); *A61K 31/685* (2013.01); *A23V 2002/00* (2013.01); *A23V 2250/1852* (2013.01); *A23V 2250/1868* (2013.01); *A23V 2250/2108* (2013.01); *A23V 2250/2112* (2013.01); *A23V 2250/708* (2013.01)

(58) Field of Classification Search
CPC .............. A61K 36/9066; A61K 9/0053; A61K 9/1623; A61K 31/375; A61K 31/685; A61K 31/5685; A23V 2002/00; A23V 2250/1852; A23V 2250/1868; A23V 2250/2108; A23V 2250/2112; A23V 2250/708; A23V 2200/322; A23V 2250/028; A23V 2250/21; A23V 2250/21166; A23V 2250/5114; A23V 2250/612; A23V 2250/642; A23L 33/115; A23L 33/12; A23L 33/15; A23L 33/105; A23L 27/14; A23L 29/015; A23L 33/16; A23L 33/17; A61P 27/06; A61P 27/10; A23P 10/28; A23P 10/30
See application file for complete search history.

(56) References Cited

U.S. PATENT DOCUMENTS

| | | |
|---|---|---|
| 8,652,518 B2 | 2/2014 | Finley |
| 2013/0273175 A1 | 10/2013 | Finley |
| 2018/0042978 A1 | 2/2018 | Minatelli et al. |

FOREIGN PATENT DOCUMENTS

| | | |
|---|---|---|
| CN | 1839815 A | 10/2006 |
| CN | 104397687 A | 3/2015 |
| CN | 106889412 A | 6/2017 |
| CN | 107473978 A | 12/2017 |
| CN | 108095112 A | 6/2018 |
| CN | 108338980 A | 7/2018 |
| CN | 109288056 A | 2/2019 |
| CN | 109673802 A | 4/2019 |
| CN | 109954033 A | 7/2019 |
| JP | 2007297304 A | 11/2007 |
| TW | I365716 B | 6/2012 |
| WO | 2009045054 A2 | 4/2009 |
| WO | 2018133618 A1 | 7/2018 |
| WO | 2019119672 A1 | 6/2019 |

OTHER PUBLICATIONS

European Patent Office, Extended European Search Report issued on Sep. 21, 2023 for counterpart European patent application No. 21785428.0 (141 pages).
Japanese Patent Office, Notice of Reasons for Refusal for Japanese Patent Application No. 2022-560892, Sep. 21, 2023 (6 Pages).
Ritch R., "Natural compounds: Evidence for a protective role in eye disease," Canadian Journal of Ophthalmology, Cnadian Ophthalmological Society, vol. 42, No. 3 Jun. 1, 2007 (14 pages).
West A., et al.,: "Evidence for the use of Nutritional Supplements and Herbal Medicines in Common Eye Diseases," American Journal of Ophthalmology, Elsevier, Amsterdam, NL, vol. 141 No.1, Jan. 1, 2006 (10 pages).
European Patent Office, Office Communication pursuant to Article 94(3) EPC, dated Sep. 26, 2024 for counterpart European patent application No. 21785428.0 (5 pages).

(Continued)

*Primary Examiner* — Jessica Worsham
(74) *Attorney, Agent, or Firm* — Nutter McClennen & Fish LLP

(57) ABSTRACT

The present invention provides an edible composition for alleviating visual fatigue. The composition comprises in parts by weight 1 to 10 parts of curcuma powder, 1 to 12 parts of whole coffee fruit extract, 1 to 20 parts of phospholipid composite, 1 to 15 parts of DHA, 0.5 to 5 parts of phosphatidylserine, and 0.1 to 5 parts of vitamin C. After one week of trial consumption by the subject, the duration of photopic vision is improved with a significant difference in comparison with that before the trial; after 2 weeks of trial consumption, the overall score of visual fatigue symptoms decreases with a significant difference in comparison with that before the trial; after 8 weeks of trial consumption by the subject, the vision field thereof is remarkably enlarged, indicating the formulation may prevent the occurrence of glaucoma. The coffee extract combined with the remaining ingredients has a synergistic effect.

12 Claims, 1 Drawing Sheet

(56) References Cited

OTHER PUBLICATIONS

China National Intellectual Property Administration, International Search Report issued for counterpart Chinese Patent Application No. PCT/CN2021/079008, mailed on Jun. 4, 2021 (3 pages).
Reyes-Izquierdo, T., et al., "Modulatory effect of coffee fruit extract on plasma levels of brain-derived neurotrophic factor in healthy subjects", British Journal of Nutrition, 2012 (6 pages).
Taiwan Patent Office, First Office Action and Search Report issued on Feb. 17, 2022 for counterpart Taiwan Patent Application No. 110109934 (4 pages).
Korean Patent Office, Request for Submission of an Opinion, Patent Application No. 10-2022-7038637, dated Jan. 13, 2025 (5 pages).

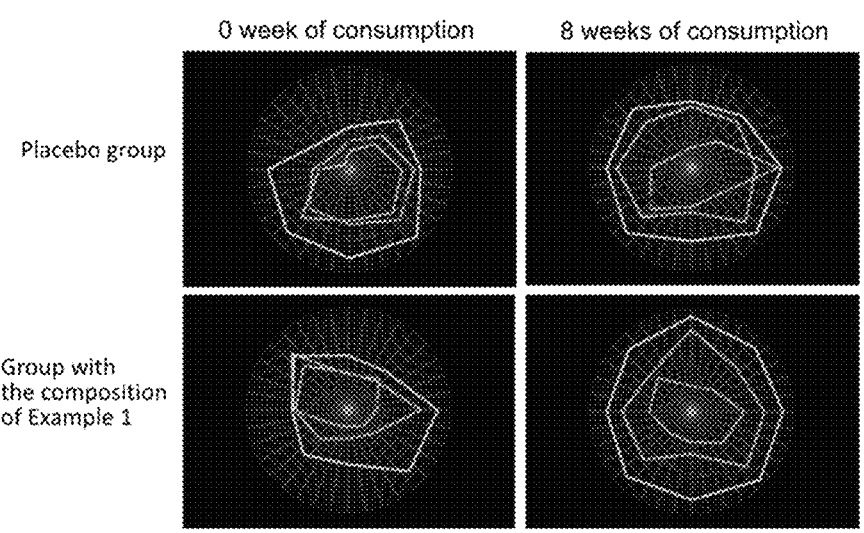

EDIBLE COMPOSITION FOR ALLEVIATING VISUAL FATIGUE

CROSS-REFERENCE TO RELATED APPLICATIONS

The present application claims priority to Chinese patent application No. 202010277606.5, filed on 10 Apr. 2020, with the title "Edible Composition for Alleviating Visual Fatigue", which is hereby incorporated by reference in its entirety.

TECHNICAL FIELD

The present invention relates to an edible composition for alleviating visual fatigue, which pertains to the field of food product technology.

BACKGROUND

Visual fatigue is a common eye condition. Specifically, it is manifested in symptoms of eye dryness, soreness, double vision, intermittent blurred vision and, in serious cases, systematic symptoms such as nausea, vomiting, dizziness, headache, neck muscle tension, shoulder soreness, which reduces the working efficiency of adults and leads to learning disturbance in adolescents and children, resulting in a direct impact on people's work and life. Mild visual fatigue is often neglected, leading to aggravation of visual fatigue symptoms. Visual fatigue remittent in a long term may lead to a variety of eye diseases, such as dry eye syndrome, refractive error, VDT (visual display terminal) syndrome, and computer vision syndrome, thereby increasing the occurrence of age-related eye diseases.

Modern nutrition and medical researches indicate that the causes of visual fatigue mainly include the following theories:

(1) Free radical theory: when the eyeball is in a search and gaze state for an extended period of time, the metabolism of extraocular muscles and ciliary muscles increases, resulting in an increase in the production and accumulation of metabolic wastes (including oxygen free radicals), which leads to structural damage and functional decline of muscle cells. Studies have shown that free radicals may cause and aggravate a variety of retinal diseases.

(2) The theory of nutrient depletion in visual cell: the excessive consumption by visual cells and the untimely supply of necessary nutrients result in prolonged recovery time of the macula and retina. The nutrients in visual cells mainly include lutein, VA, polyunsaturated fatty acids, VB1, VB2, and mineral micronutrients.

(3) Retinal damage theory: the focusing of visible light on the retina results in high oxygen pressure, high concentrating of light, and likelihood of lipid peroxidation, the products of which phagocytose retinal pigment epithelial cells and leads to retinal damage.

(4) Retinal cell aging theory: the aging of retinal pigment epithelial cells leads to aging of the eyes, which in turn induces age-related eye diseases such as decreased macular pigment optical density (MPOD).

SUMMARY OF INVENTION

In view of the problems in the prior art, an object of the present invention is to provide an edible composition for alleviating visual fatigue and the use thereof. This composition can effectively alleviate visual fatigue and prevent the occurrence of glaucoma.

The object of the invention is accomplished by the following technical solutions:

In one aspect, the present invention provides an edible composition comprising in parts by weight:

| | |
|---|---|
| curcuma powder | 1 to 10 parts; |
| whole coffee fruit extract | 1 to 12 parts; |
| phospholipid composite | 1 to 20 parts; |
| DHA | 1 to 15 parts; |
| phosphatidylserine | 0.5 to 5 parts; |
| vitamin C | 0.1 to 5 parts. |

In the edible composition of the invention, the phospholipid composite is free of phosphatidylserine.

There is no report on effects for visual fatigue and protection of eyesight and optic nerves with whole coffee fruit extract in the prior art. The inventor has made a creative discovery upon extensive experiments that consumption of the whole coffee fruit extract in combination with curcuma powder, a phospholipid composite, DHA, phosphatidylserine and vitamin C was effective in alleviating visual fatigue. Specifically, it was found in studies that by using the composition, obtained from mixing these 6 raw materials in certain proportions, for consumption, the duration of photopic vision was improved after one week of trial consumption by the subject with a significant difference in comparison with that before the trial; after two weeks of trial consumption, the overall score of visual fatigue symptoms decreased with a significant difference in comparison with that before the trial. Also found in the studies was that by consumption of only the raw material, the whole coffee fruit extract, or a composition of the remaining 5 raw materials except the whole coffee fruit extract, there was no significant change in the duration of photopic vision and the overall score of visual fatigue symptoms of the subject, whereas a composition combining the 6 raw materials had a synergistic effect in alleviating visual fatigue. Furthermore, after 8 weeks of trial consumption by the subject, the vision field thereof was remarkably enlarged, indicating the formulation may prevent the occurrence of glaucoma.

The raw materials such as curcuma powder, whole coffee fruit extract, phospholipid complex, DHA, phosphatidylserine and vitamin C used in the present invention are commercially available, and may also be prepared according to the prior art. Each raw material should meet quality requirements in relevant industry standards.

In some particular embodiments, in the edible composition of the present invention, the content of curcumin, the principle active ingredient in curcuma powder, is 20% or more, e.g., 30% or more, 40% or more, 50% or more, 60% or more, 70% or more, 80% or more, or even 90% or more. The amount of curcuma powder used in the edible composition of the present invention may be appropriately adjusted according to the level of the curcumin content in the curcuma powder.

In some particular embodiments, in the edible composition of the present invention, the whole coffee fruit extract is a mixture extracted from the whole coffee fruit. For example, the whole coffee fruit extract may be obtained by subjecting the coffee fruit to extracting with an aqueous solution of ethanol, concentrating and drying. With respect to 100% by mass of the whole coffee fruit extract, the active ingredients in the whole coffee fruit extract include 20% to 50% of total chlorogenic acids and 0.5% to 5% of proanthocyanidin; wherein the total chlorogenic acids include neochlorogenic acid, and the neochlorogenic acid is present in the whole coffee fruit extract in an amount of 1% to 20%.

In some particular embodiments, in the edible composition of the present invention, the principle active ingredients in the phospholipid composite include phosphatidylethanolamine, phosphatidylcholine, phosphatidylinositol and ceramide, and with respect to 100% by mass of the phospholipid composite, the content of phosphatidylethanolamine is 5% to 5.5%, the content of phosphatidylcholine is 4% to 5.5%, the content of phosphatidylinositol is 0.5% to 1.8%, and the content of ceramide is 1.5% to 2.5%, with the rest of the phospholipid composite including a majority of proteins and the like. The phospholipid composite used in the present invention may be purchased from Lecico GmbH, or can be prepared according to the prior art.

In the above edible composition, preferably, the composition consists of curcuma powder, whole coffee fruit extract, phospholipid composite, DHA, phosphatidylserine, and vitamin C.

In the edible composition of the present invention, based on the free radical theory and the retinal depletion theory, addition of curcuma powder may inhibit the lipid peroxidation mediated by metal ions, protect the intracellular DNA from the damage of oxidized lipids. Vitamin C is an important nutrient for the lens, having a content in the lens much higher than that in other tissues, and insufficient intake of vitamin C may cause the lens to become cloudy and cause cataracts in severe cases; meanwhile, vitamin C has strong antioxidation properties and can scavenge free radicals and reduce lipid peroxide levels, and the addition of vitamin C in the present invention can effectively alleviate age-related eye diseases and visual damage. Whole coffee fruit extract mainly comprises total chlorogenic acid, neochlorogenic acid and proanthocyanidin, and may reduce the damage of lipid peroxides to the retina. Based on the theory of nutrient depletion by visual cell, DHA, phospholipid complex and phosphatidylserine are supplemented in the formulation of the edible composition of the present invention. DHA is one of the most abundant polyunsaturated fatty acids in the retina, and can provide the nutrients necessary for the growth of visual cells. The addition of phospholipid composite can improve cognition and improve memory. Phosphatidylcholine in the phospholipid composite can be hydrolyzed in vivo to produce choline, the precursor for the synthesis of the neurotransmitter acetylcholine, which is the basic substance for the transmitting information, establishing constant communication, and forming thoughts and the ability of thinking among nerve cells in the brain. Sufficient intake of phosphatidylcholine is advantageous for the formation of more neurotransmitters (acetylcholine), which makes the brain more energetic and thus enhances memories, thereby facilitating the improvement of intelligence. Phosphatidylserine is capable of lowering excessive stress hormone levels in the body, reducing stress, alleviating brain fatigue, promoting focus of attention, improving alertness and memory, and relieving negative emotions. The studies in the particular examples of the present invention demonstrate that the composition obtained by combining the six raw materials of the present invention has a synergistic effect, and is helpful to alleviate visual fatigue and prevent the occurrence of glaucoma.

In addition, the effect of the whole coffee fruit extract in combination with the remaining five raw materials according to the present invention is better than that of a proanthocyanidin-containing extract such as cranberry extract, blueberry extract, grape seed extract or the like in combination with the remaining five raw materials.

According to a particular embodiment of the invention, the composition preferably comprises in parts by weight:

| | |
|---|---|
| curcuma powder | 8 parts; |
| whole coffee fruit extract | 10 parts; |
| phospholipid composite | 10 parts; |
| DHA | 7 parts; |
| phosphatidylserine | 2 parts; |
| vitamin C | 1 part. |

In another aspect, the present invention provides the use of the above edible composition in alleviating visual fatigue. Particularly, the use of the edible composition in the manufacture of a food product having an effect in alleviating visual fatigue is provided.

In still another aspect, the present invention provides the use of the above edible composition in preventing glaucoma. Particularly, the use of the edible composition in the manufacture of a food product having an effect in preventing glaucoma is provided.

According to a particular embodiment of the invention, in the use described above, the food product comprises an effective amount of the above edible composition, and may optionally comprises an excipient.

The excipient may be an excipient commonly used in the field of food product products such as one or more of sorbitol, maltodextrin, magnesium stearate, lactose, and whole milk powder, but is not limited thereto.

According to a particular embodiment of the invention, in the use described above, the food product is present in a form of a tablet, a capsule, powder, or a granule, but is not limited thereto. The tablet, capsule, powder, or granule may be prepared by referring to the prior art.

In yet another aspect, the present invention provides a food product comprising:

| | |
|---|---|
| curcuma powder | 1% to 10%; |
| whole coffee fruit extract | 1% to 12%; |
| phospholipid composite | 1% to 20%; |
| DHA | 1% to 15%; |
| phosphatidylserine | 0.5% to 5%; |
| vitamin C | 0.1% to 5% | with respect to 100% by the total mass of the food product.

In the above-mentioned food product, in addition to the 6 nutrient components, also included is an excipient commonly used in the field of food product products, e.g., one or more of sorbitol, maltodextrin, magnesium stearate, lactose, and whole milk powder, but not limited thereto.

According to a particular embodiment of the invention, the food product comprises:

| | |
|---|---|
| curcuma powder | 8%; |
| whole coffee fruit extract | 10%; |
| phospholipid composite | 10%; |
| DHA | 7%; |
| phosphatidylserine | 2%; |
| vitamin C | 1% | with respect to 100% by the total mass of the food product.

In another aspect, the present invention provides the use of the above food product in alleviating visual fatigue.

In still another aspect, the present invention provides the use of the above food product in preventing glaucoma.

The edible composition provided in the present invention is effective in alleviating visual fatigue. After one week of trial consumption by the subject, the duration of photopic vision is improved with a significant difference in comparison with that before the trial; after two weeks of trial consumption, the overall score of visual fatigue symptoms decreases with a significant difference in comparison with that before the trial; after 8 weeks of trial consumption by the subject, the vision field thereof is remarkably enlarged, indicating the formulation may prevent the occurrence of glaucoma. The combination of the whole coffee fruit extract and the remaining 5 ingredients in the present invention has a good synergistic effect.

BRIEF DESCRIPTION OF THE DRAWINGS

FIG. 1 shows a comparative diagram of the change in the vision field of the subjects before and after the consumption of the compositions in various groups in Example 1 according to the invention.

DETAILED DESCRIPTION OF INVENTION

For a better understanding of the technical features, objectives and advantageous effects of the present invention, detailed description of the technical solutions of the invention are hereinafter provided, which, however, cannot be construed as limitation to the implementable scope of the present invention. The raw materials in the following examples are obtained from conventional commercial products unless otherwise specified.

Example 1

This example provides an edible composition for alleviating visual fatigue comprising in parts by weight:

| | |
|---|---|
| curcuma powder | 8 parts; |
| whole coffee fruit extract | 10 parts; |
| phospholipid composite | 10 parts; |
| DHA | 7 parts; |
| phosphatidylserine | 2 parts; |
| vitamin C | 1 part; |
| sorbitol | 30 parts; |
| magnesium stearate | 3 parts; |
| lactose | 20 parts; |
| whole milk powder | 9 parts. |

Here, the content of the curcumin in the curcuma powder is about 20% to 30%. In the whole coffee fruit extract, the content of the total chlorogenic acids is about 30% to 40%, with a neochlorogenic acid content of about 10% to 20% and a proanthocyanidin content of about 1% to 5%. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, whole coffee fruit extract (obtained by subjecting coffee fruit to extracting with an aqueous solution of ethanol, concentrating and drying), phospholipid composite (purchased from Lecico GmbH), DHA, phosphatidylserine, vitamin C, sorbitol, magnesium stearate, lactose, and whole milk powder were weighed in the proportions by weight, evenly mixed and tableted, to prepare an edible composition for alleviating visual fatigue.

The composition prepared in this example was given to subjects for trial consumption (with a consumption amount of 4.8 g/day), and a placebo group was used as the control group (in addition to the same excipients and the contents thereof, the 6 active ingredients were replaced with maltodextrin in an equivalent content). The change in the duration of photopic vision and the change in the total score of visual fatigue symptoms were investigated in various groups. The results are shown below:

TABLE 1

| Groups | | Placebo group (n = 7) | Group with the composition of Example 1 (n = 9) |
|---|---|---|---|
| Duration of photopic vision (%) | 0 w | 63.13 ± 8.71 | 60.74 ± 14.18 |
| | 1 w | 57.70 ± 8.95 | 69.55 ± 14.61$^{ab}$ |
| | 2 w | 60.09 ± 6.56 | 73.24 ± 10.45$^{AB}$ |
| | 3 w | 58.45 ± 16.51 | 74.80 ± 12.54$^{Ab}$ |
| | 4 w | 60.05 ± 4.64 | 73.88 ± 13.16$^{Ab}$ |
| | 5 w | 61.34 ± 7.17 | 75.52 ± 10.61$^{AB}$ |
| | 6 w | 55.04 ± 12.69 | 77.93 ± 9.92$^{AB}$ |
| | 7 w | 56.83 ± 9.62 | 75.62 ± 12.86$^{AB}$ |
| | 8 w | 53.53 ± 8.92$^{a}$ | 74.72 ± 11.15$^{AB}$ |

Note:
A—compared with value before trial, P < 0.01;
a—compared with value before trial, P < 0.05;
B—compared with the placebo group, P < 0.01,
b—compared with the placebo group, P < 0.05.

The same symbols apply to the tables hereinbelow.

TABLE 2

| Groups | | Placebo group (n = 7) | Group with the composition of Example 1 (n = 9) |
|---|---|---|---|
| Total score of visual fatigue symptoms | 0 w | 6.43 ± 6.63 | 6.22 ± 4.63 |
| | 1 w | 3.00 ± 1.63 | 4.63 ± 3.38 |
| | 2 w | 2.83 ± 2.04 | 4.11 ± 3.10$^{a}$ |
| | 3 w | 2.43 ± 1.27 | 3.67 ± 3.16$^{a}$ |
| | 4 w | 2.57 ± 1.27 | 2.88 ± 3.14$^{A}$ |
| | 5 w | 2.17 ± 0.41 | 2.63 ± 2.83$^{A}$ |
| | 6 w | 2.57 ± 1.27 | 2.00 ± 2.35$^{A}$ |
| | 7 w | 2.43 ± 0.98 | 2.22 ± 2.54$^{A}$ |
| | 8 w | 1.86 ± 1.35 | 2.22 ± 2.22$^{A}$ |

It can be seen from Tables 1 and 2 that there is no statistically significant difference in terms of the duration of photopic vision and the total score of visual fatigue symptoms in the subjects before the trial consumption, and therefore were comparable between the groups. After 8 weeks of trial consumption, for the placebo group, the comparison in the duration of photopic vision and the total score of visual fatigue symptoms before and after the trial shows no statistical significance (P>0.05). For the group with the composition of Example 1, the duration of photopic vision tends to increase, with a significant difference after one week of trial consumption, as compared to both that before the trial and that of the placebo group, and duration of photopic vision in the group with the composition of Example 1 was increased by more than 10%. Further, the total score of visual fatigue symptoms in the group with the composition of Example 1 decreases with a significant difference as compared to that before the trial (P<0.05). Thus, the composition of Example 1 is advantageous in alleviating visual fatigue.

In addition, early symptom of glaucoma is manifested in the shrinkage of the vision field. As seen from FIG. 1, after 8 weeks of consumption of the composition of Example 1, the vision field of the subjects were remarkably enlarged, indicating the formulation may prevent the occurrence of glaucoma.

Example 2

This example provides an edible composition for alleviating visual fatigue comprising in parts by weight:

| | |
|---|---|
| curcuma powder | 10 parts; |
| whole coffee fruit extract | 12 parts; |
| phospholipid composite | 20 parts; |
| DHA | 15 parts; |
| phosphatidylserine | 5 parts; |
| vitamin C | 5 part; |
| sorbitol | 20 parts; |
| magnesium stearate | 3 parts; |
| lactose | 5 parts; |
| whole milk powder | 5 parts. |

Here, the content of the curcumin in the curcuma powder is about 20% to 30%. In the whole coffee fruit extract, the content of the total chlorogenic acids is about 30% to 40%, with a neochlorogenic acid content of about 10% to 20% and a proanthocyanidin content of about 1% to 5%. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, whole coffee fruit extract (obtained by subject coffee fruit to extracting with an aqueous solution of ethanol, concentrating and drying), phospholipid composite (purchased from Lecico GmbH), DHA, phosphatidylserine, vitamin C, sorbitol, magnesium stearate, lactose, and whole milk powder were weighed in the proportions by weight, evenly mixed and tableted, to prepare an edible composition for alleviating visual fatigue.

Example 3

This example provides an edible composition for alleviating visual fatigue comprising in parts by weight:

| | |
|---|---|
| curcuma powder | 1 part; |
| whole coffee fruit extract | 1 part; |
| phospholipid composite | 1 part; |
| DHA | 1 part; |
| phosphatidylserine | 0.5 part; |
| vitamin C | 0.1 part; |
| sorbitol | 63.4 parts; |
| magnesium stearate | 3 parts; |
| lactose | 20 parts; |
| whole milk powder | 9 parts. |

Here, the content of the curcumin in the curcuma powder is about 20% to 30%. In the whole coffee fruit extract, the content of the total chlorogenic acids is about 30% to 40%, with a neochlorogenic acid content of about 10% to 20% and a proanthocyanidin content of about 1% to 5%. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, whole coffee fruit extract (obtained by subjecting coffee fruit to extracting with an aqueous solution of ethanol, concentrating and drying), phospholipid composite (purchased from Lecico GmbH), DHA, phosphatidylserine, vitamin C, sorbitol, magnesium stearate, lactose, and whole milk powder were weighed in the proportions by weight, evenly mixed and tableted, to prepare an edible composition for alleviating visual fatigue.

Comparative Example 1

This comparative example provides an edible composition for alleviating visual fatigue comprising in parts by weight:

| | |
|---|---|
| whole coffee fruit extract | 10 parts; |
| sorbitol | 30 parts; |
| magnesium stearate | 3 parts; |
| lactose | 20 parts; |
| whole milk powder | 9 parts; |
| maltodextrin | 28 parts. |

Here, in the whole coffee fruit extract, the content of the total chlorogenic acids is about 30% to 40%, with a neochlorogenic acid content of about 10% to 20% and a proanthocyanidin content of about 1% to 5%.

The preparation process for the composition was as follows: whole coffee fruit extract (obtained by subjecting coffee fruit to extracting with an aqueous solution of ethanol, concentrating and drying), sorbitol, magnesium stearate, lactose, whole milk powder and maltodextrin were weighed in the proportions by weight, evenly mixed and tableted, to prepare an edible composition for alleviating visual fatigue.

Comparative Example 2

This comparative example provides an edible composition for alleviating visual fatigue comprising in parts by weight:

| | |
|---|---|
| curcuma powder | 8 parts; |
| phospholipid composite | 10 parts; |
| DHA | 7 parts; |
| phosphatidylserine | 2 parts; |
| vitamin C | 1 part; |
| sorbitol | 30 parts; |
| magnesium stearate | 3 parts; |
| lactose | 20 parts; |
| whole milk powder | 9 parts; |
| maltodextrin | 10 parts. |

Here, the content of the curcumin in the curcuma powder is about 20% to 30%. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, phospholipid composite (purchased from Lecico GmbH), DHA, phosphatidylserine, vitamin C, sorbitol, magnesium stearate, lactose, whole milk powder and maltodextrin were weighed in the proportions by weight, evenly mixed and tableted, to prepare an edible composition for alleviating visual fatigue.

As compared to Example 1 of present invention, only one active ingredient, the whole coffee fruit extract, was added in the Comparative Example 1, with an equivalent of the amount of the active ingredient used. As compared to Example 1 of present invention, the whole coffee fruit extract as an active ingredient was not added, but the other 5 active ingredients, curcuma powder, phospholipid composite, DHA, phosphatidylserine, and vitamin C, were added instead. The experimental procedures same as in Example 1 were conducted accordingly. The experimental results are shown in Tables 3 and 4 below.

TABLE 3

| Groups | | Placebo group (n = 5) | Group with the composition of Comparative Example 1 (n = 6) | Group with the composition of Comparative Example 2 (n = 7) |
|---|---|---|---|---|
| Duration of photopic vision (%) | 0 w | 64.17 ± 13.98 | 64.00 ± 9.84 | 67.02 ± 14.15 |
| | 1 w | 65.49 ± 8.27 | 64.72 ± 11.08 | 64.49 ± 13.37 |
| | 2 w | 70.28 ± 13.40 | 63.70 ± 14.77 | 61.83 ± 8.52 |
| | 3 w | — | — | — |
| | 4 w | 65.14 ± 10.10 | 68.75 ± 11.80 | 62.87 ± 10.24 |
| | 5 w | 73.96 ± 9.66 | 64.77 ± 14.35 | 71.11 ± 14.81$^a$ |
| | 6 w | 68.28 ± 12.62 | 63.52 ± 15.01 | 71.85 ± 11.17 |
| | 7 w | 73.75 ± 13.42 | 65.88 ± 10.31 | 73.61 ± 15.29 |
| | 8 w | 67.78 ± 12.40 | 67.00 ± 14.07 | 66.61 ± 15.39 |
| | 9 w | 74.33 ± 16.80$^a$ | 65.69 ± 11.55 | 73.52 ± 11.82 |

TABLE 4

| Groups | | Placebo group (n = 5) | Group with the composition of Comparative Example 1 (n = 6) | Group with the composition of Comparative Example 2 (n = 7) |
|---|---|---|---|---|
| Total score of visual fatigue symptoms | 0 w | 3.60 ± 2.41 | 4.83 ± 2.64 | 3.57 ± 2.76 |
| | 1 w | 3.50 ± 2.8$^a$ | 2.83 ± 1.83$^A$ | 2.83 ± 2.56 |
| | 2 w | 2.80 ± 2.59 | 3.17 ± 1.94$^A$ | 2.20 ± 2.39 |
| | 3 w | — | — | — |
| | 4 w | 3.00 ± 2.16$^a$ | 3.50 ± 2.65 | 2.33 ± 2.94$^a$ |
| | 5 w | 3.25 ± 2.99 | 3.50 ± 2.07$^a$ | 2.67 ± 3.50 |
| | 6 w | 2.80 ± 2.77$^a$ | 3.50 ± 1.87$^a$ | 2.67 ± 2.58 |
| | 7 w | 3.25 ± 2.75 | 4.00 ± 2.00 | 4.50 ± 2.12 |
| | 8 w | 4.50 ± 3.54 | 3.60 ± 1.67 | 2.40 ± 2.79 |
| | 9 w | 3.20 ± 3.11 | 3.50 ± 1.76 | 1.83 ± 1.83$^A$ |

As seen from Tables 3 and 4, after 9 weeks of trial consumption, there was no obvious change in the duration of photopic vision and the total score of visual fatigues symptoms in the group having the composition of Comparative Example 1 and in the group having the composition of Comparative Example 2; neither was there any significant difference as compared to the placebo group.

Comparative Example 3

This comparative example provides an edible composition which is different from that of Example 1 by replacing the whole coffee fruit extract with a commercial grape seed extract. The composition comprises in part by weight:

| | |
|---|---|
| curcuma powder | 8 parts; |
| grape seed extract | 10 parts; |
| phospholipid composite | 10 parts; |
| DHA | 7 parts; |
| phosphatidylserine | 2 parts; |
| vitamin C | 1 part; |
| sorbitol | 30 parts; |
| magnesium stearate | 3 parts; |
| lactose | 20 parts; |
| whole milk powder | 9 parts. |

Here, the content of the curcumin in the curcuma powder is about 20% to 30%. The content of proanthocyanidin in the grape seed extract is 90% or more. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, grape seed extract, phospholipid composite (purchased from Lecico GmbH), DHA, phosphatidylserine, vitamin C, sorbitol, magnesium stearate, lactose, whole milk powder, and maltodextrin were weighed in the proportions by weight, evenly mixed and tableted, to prepare an edible composition for alleviating visual fatigue.

Comparative Example 4

This comparative example provides an edible composition which is different from that of Example 1 by replacing the whole coffee fruit extract with a commercial blueberry extract. The composition comprises in part by weight:

| | |
|---|---|
| curcuma powder | 8 parts; |
| blueberry extract | 10 parts; |
| phospholipid composite | 10 parts; |
| DHA | 7 parts; |
| phosphatidylserine | 2 parts; |
| vitamin C | 1 part; |
| sorbitol | 30 parts; |
| magnesium stearate | 3 parts; |
| lactose | 20 parts; |
| whole milk powder | 9 parts. |

Here, the content of the curcumin in the curcuma powder is about 20% to 30%. The content of anthocyanidin in the blueberry extract is 20% or more. In the phospholipid composite, the content of phosphatidylethanolamine is about 5% to 5.5%, the content of phosphatidylcholine is about 4% to 5.5%, the content of phosphatidylinositol is about 0.5% to 1.8%, and the content of ceramide is about 1.5% to 2.5%.

The preparation process for the composition was as follows: curcuma powder, blueberry extract, phospholipid composite (purchased from Lecico GmbH), DHA, phosphatidylserine, vitamin C, sorbitol, magnesium stearate, lactose, whole milk powder, and maltodextrin were weighed in the proportions by weight, evenly mixed and tableted, to prepare an edible composition for alleviating visual fatigue.

As compared to Example 1 of the present invention, in Comparative Examples 3 and 4, only the whole coffee fruit extract was replaced with grape seed extract and blueberry extract, respectively, with each extract used in the same amount. The active ingredient proanthocyanidin in the grape seed extract (with a content of ≥90%) was much more than the active ingredient proanthocyanidin in the whole coffee fruit extract of the present invention (with a content of 1% to 5%), and the total chlorogenic acid and neochlorogenic acid, were not included as active ingredients in the whole coffee fruit extract. For the blueberry extract, the active ingredient, anthocyanidin (with a content of ≥20%), was different from the active ingredients in the whole coffee fruit extract of the present invention. According to the experimental procedures of Example 1, the compositions prepared in Comparative Examples 3 and 4 were given to subjects for trial consumption (with a consumption amount of 4.8 g/day), and the change in the duration of photopic vision and the change in the total score of visual fatigue symptoms were investigated in various groups. The experimental results are shown in Table 5 below.

TABLE 5

| Groups | | Group with the composition of Comparative Example 3 (n = 8) | Group with the composition of Comparative Example 4 (n = 8) |
|---|---|---|---|
| Duration of photopic vision (%) | 0 w | 61.81 ± 12.07 | 61.56 ± 10.30 |
| | 1 w | 58.21 ± 7.83 | 63.06 ± 8.90 |
| | 2 w | 60.35 ± 13.41 | 61.47 ± 9.55 |
| | 3 w | 56.01 ± 7.67 | 63.73 ± 13.00 |
| | 4 w | 61.01 ± 10.39 | 63.89 ± 13.51 |

As seen from Table 5, after 4 weeks of trial consumption, there was no obvious change in the duration of photopic vision and the total score of visual fatigues symptoms in the group with the composition of Comparative Example 3 and in the group with the composition of Comparative Example 4. In comparison with regard to Table 1, it can be seen that the duration of photopic vision were significantly improved in the subjects after one week of the consumption of the composition of Example 1.

Overall, it can be seen that only by consumption of all the active ingredients in the composition of the present invention in the proportions that an effect in alleviating visual fatigue is achieved, whereas the effect in alleviating visual fatigue could hardly achieved by using some of the active ingredients. Further, the effect of the whole coffee fruit extract of the present invention in combination with the remaining five raw materials is better than that of a proanthocyanidin-containing extract such as cranberry extract, blueberry extract, grape seed extract or the like in combination with the remaining five raw materials.

The invention claimed is:

1. An edible composition, comprising in parts by weight:

| | |
|---|---|
| curcuma powder | 1 to 10 parts; |
| whole coffee fruit extract | 1 to 12 parts; |
| phospholipid composite | 1 to 20 parts; |
| DHA | 1 to 15 parts; |
| phosphatidylserine | 0.5 to 5 parts; |
| vitamin C | 0.1 to 5 parts. |

2. The edible composition according to claim 1, wherein the active ingredients in the whole coffee fruit extract include 20% to 50% of total chlorogenic acids and 0.5% to 5% of proanthocyanidin, with respect to 100% by mass of the whole coffee fruit extract; wherein the total chlorogenic acids include neochlorogenic acid, and the neochlorogenic acid is present in the whole coffee fruit extract in an amount of 1% to 20%.

3. The edible composition according to claim 1, wherein the active ingredients in the phospholipid composite comprise 5% to 5.5% of phosphatidyl ethanolamine, 4% to 5.5% of phosphatidylcholine, 0.5% to 1.8% of phosphatidylinositol, and 1.5% to 2.5% of ceramide, with respect to 100% by mass of the phospholipid composite.

4. The edible composition according to claim 1, wherein the composition consists of the curcuma powder, the whole coffee fruit extract, the phospholipid composite, the DHA, the phosphatidylserine, and the vitamin C.

5. The edible composition according to claim 1, comprising in parts by weight:

| | |
|---|---|
| curcuma powder | 8 parts; |
| whole coffee fruit extract | 10 parts; |
| phospholipid composite | 10 parts; |
| DHA | 7 parts; |
| phosphatidylserine | 2 parts; |
| vitamin C | 1 part. |

6. A food product having an effect in alleviating visual fatigue or preventing glaucoma, wherein, the food product comprises the edible composition according to claim 1.

7. The food product according to claim 6, wherein the food product comprises an effective amount of the edible composition according to claim 1.

8. The food product according to claim 7, wherein the food product further comprises an excipient.

9. The food product according to claim 8, wherein the excipient includes one or more of sorbitol, maltodextrin, magnesium stearate, lactose, and whole milk powder.

10. The food product according to claim 8, wherein the food product is present in a form of a tablet, a capsule, powder, or a granule.

11. A food product comprising:

| | |
|---|---|
| curcuma powder | 1% to 10%; |
| whole coffee fruit extract | 1% to 12%; |
| phospholipid composite | 1% to 20%; |
| DHA | 1% to 15%; |
| phosphatidylserine | 0.5% to 5%; |
| vitamin C | 0.1% to 5% | with respect to 100% by the total mass of the food product.

12. The food product according to claim 11 comprising:

| | |
|---|---|
| curcuma powder | 8%; |
| whole coffee fruit extract | 10%; |
| phospholipid composite | 10%; |
| DHA | 7%; |
| phosphatidylserine | 2%; |
| vitamin C | 1% | with respect to 100% by the total mass of the food product.

* * * * *